Jan. 7, 1964 W. P. CARROLL, JR., ETAL 3,117,314
AUTOMATIC CAMERA DETECTION SYSTEMS
Filed Aug. 26, 1959 3 Sheets-Sheet 1

INVENTORS:
William P. Carroll Jr.,
Albert H. Johnson
and Marvin L. Haiman,
BY Bair, Freeman & Molinare
ATTORNEYS.

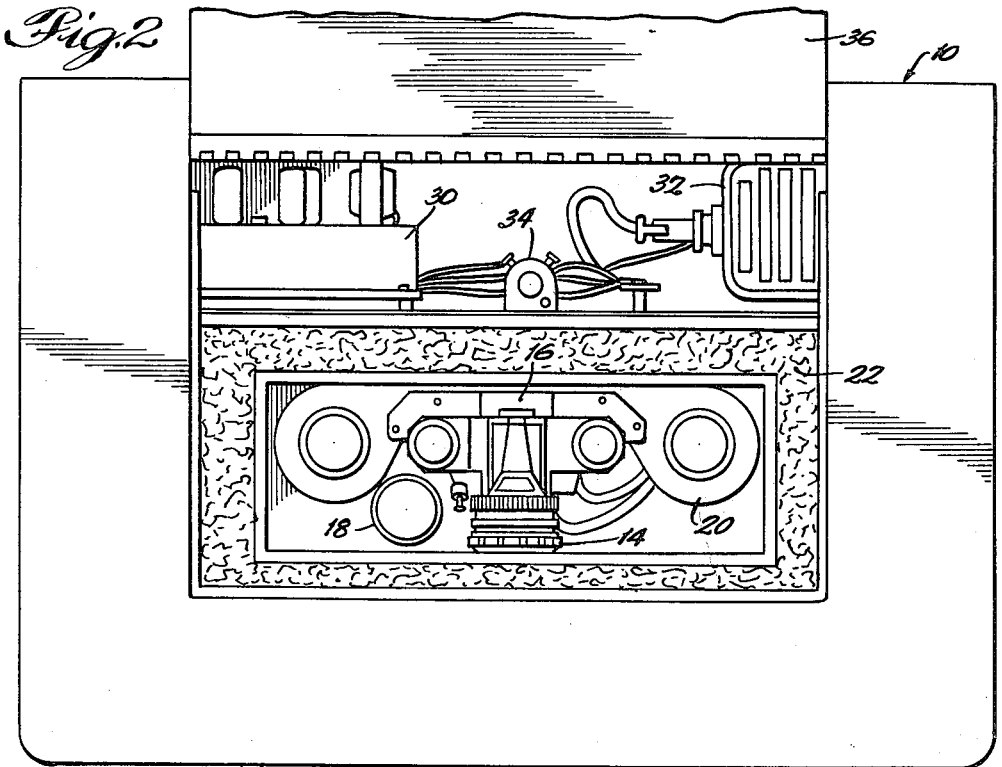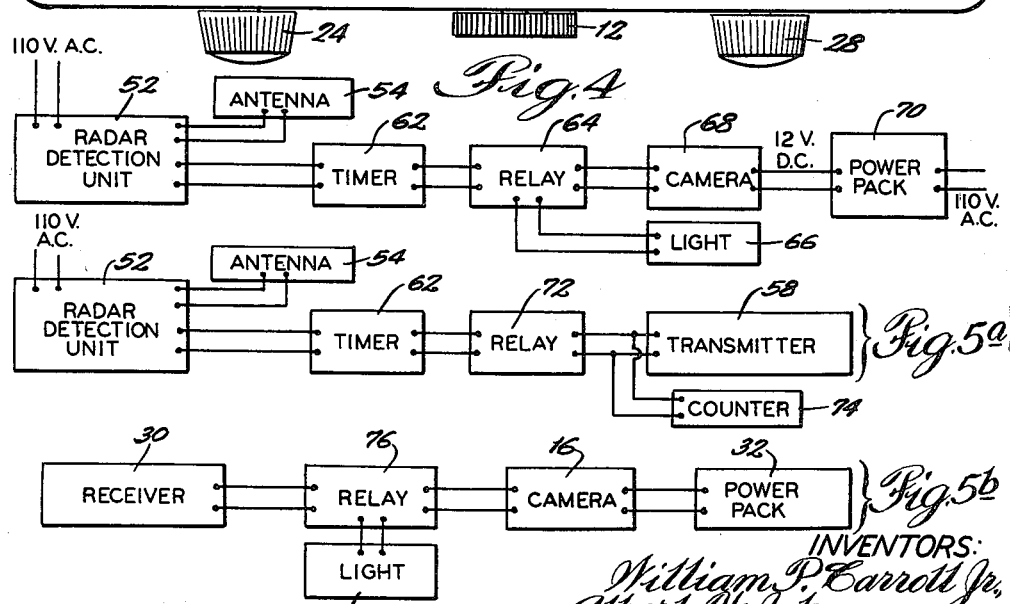

Jan. 7, 1964  W. P. CARROLL, JR., ETAL  3,117,314
AUTOMATIC CAMERA DETECTION SYSTEMS
Filed Aug. 26, 1959  3 Sheets-Sheet 3
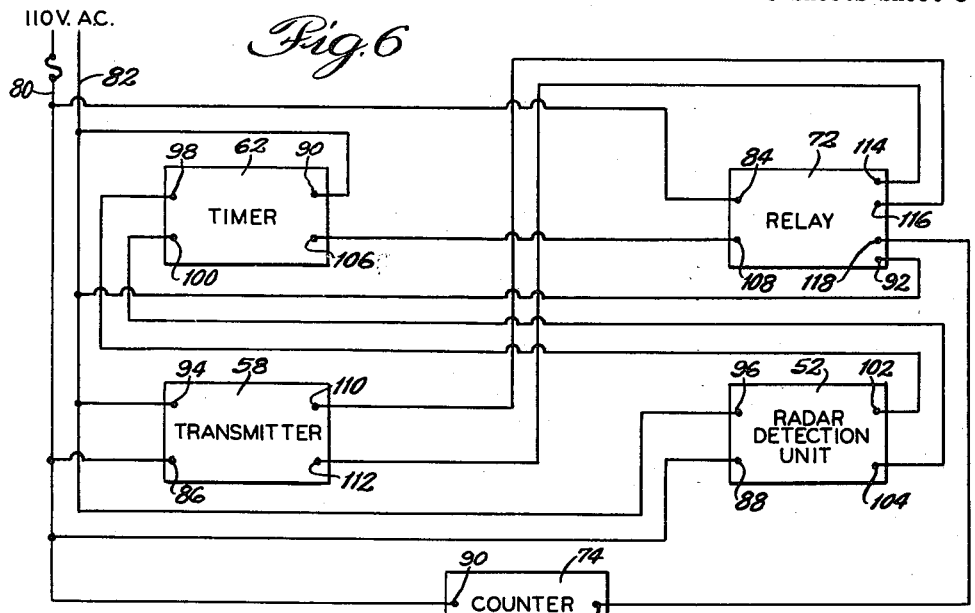
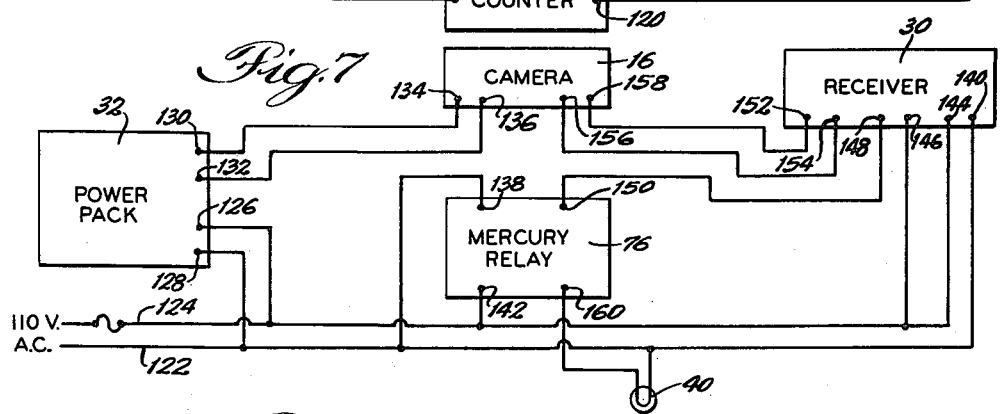
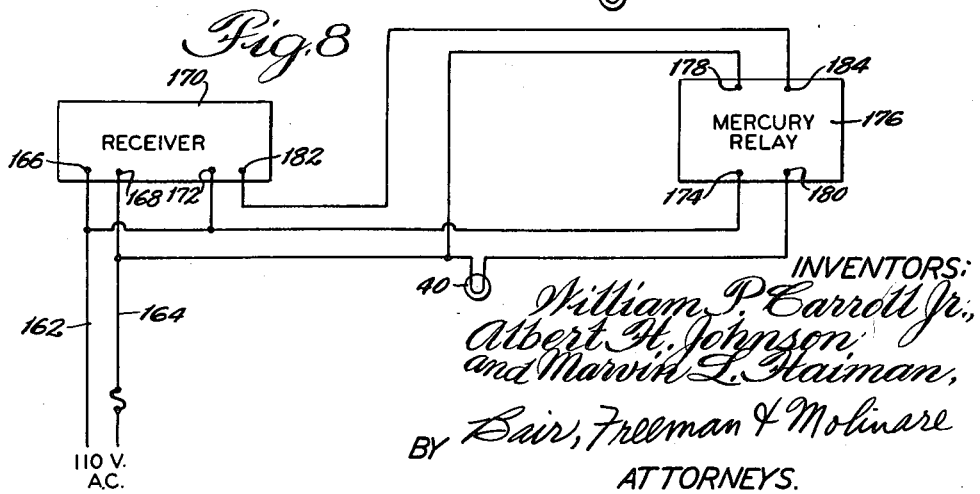
INVENTORS:
William P. Carroll Jr.,
Albert H. Johnson,
and Marvin L. Haiman,
BY Bair, Freeman & Molinare
ATTORNEYS.

United States Patent Office 3,117,314
Patented Jan. 7, 1964

3,117,314
AUTOMATIC CAMERA DETECTION SYSTEMS
William P. Carroll, Jr., 322 Devonshire Road, Tower Lakes, Barrington, Ill.; Albert H. Johnson, 2109 W. 68th St., Chicago, Ill.; and Marvin L. Haiman, 2332 Belleview Ave., Westchester, Ill.
Filed Aug. 26, 1959, Ser. No. 836,091
7 Claims. (Cl. 343—7)

This invention relates generally to improvements in electronic detection systems, and more particularly to new and improved automatic electronic detection and recording apparatus.

Frequently, it is highly advantageous to make a photographic record in an automatic fashion and in response to the occurrence of a given event. For example, where for purpose of military or industrial security, or whereever it is desired to detect an unauthorized entry into a restricted area, it is desirable to cause a camera to be triggered automatically upon the detection of an intruder, without placing him upon notice that his picture is being taken. Several systems have been disclosed in the prior art towards effecting this end, but the use of these prior art systems has been limited by the relative size, complexity and cost of the equipment which heretofore has been available for this purpose.

Accordingly, it is a general object of this invention to provide new and improved automatically operated and electronically controlled camera apparatus.

It is another object of this invention to provide such electronically controlled camera apparatus which is characterized by its compact size, the relatively simple and small number of components required, and by its automatic and highly efficient operation.

In accordance with a feature of this invention, the novel camera and control apparatus comprises in one illustrative embodiment, a compact housing having positioned therewithin a power source, electronic detection apparatus adapted to transmit a beam of signal energy and to provide an output signal whenever the beam is interrupted upon detection of an unauthorized person within the area being guarded by the invention, timing and switching means actuated in response to the output signal from the electronic detection apparatus and adapted to provide a plurality of switching functions within a predetermined time period, a source of light energized in accordance with the switching functions, and an automatically operated camera of the type having an electric motor drive and a bulk film pack for effecting a plurality of exposures as determined by the switching functions of the timing and switching means.

In accordance with a further feature of the invention, the source of light preferably is in the range invisible to the human eye, such as infra-red, or the like, and the bulk film of the camera is of a type sensitive to the invisible light utilized to the end that photographs may be taken under all light conditions, from total darkness to bright sunlight without making the subject aware of the fact that he is being photographed.

The possibility of the subject becoming aware of the detection and photographing function is further avoided, in accordance with another illustrative embodiment of the invention, by positioning the camera remote from the electronic detection apparatus. Thus, should there be any noise or sound from the camera as a result of film or shutter movement, such noise or sound is minimized by mounting the camera in a sound proofed enclosure and by placing the camera remote from the subject even though the control apparatus and the light source are positioned relatively close to the guarded area.

Thus, it is a still further object of this invention to provide electronically controlled camera detection apparatus, as described above, wherein the subject is photographed with invisible light and with a minimum of noise, to prevent awareness by the subject of the photographing operation.

It is a further object of this invention to provide an improved electronically controlled camera detection apparatus, as described above, wherein the detection and control equipment is positioned adjacent the guarded area while the camera equipment is positioned remote from the guarded area to enhance secrecy of the detection and photographing operation.

It is a still further feature of this invention to provide an improved electronically controlled camera detection apparatus having automatically operated switching and timing means for effecting a selective and relatively high number of exposures during a predetermined time interval.

These and other novel features which are characteristic of the invention are set forth with particularity in the appended claims. The invention, itself, both as to its organization and method of operation, together with further objects and advantages thereof, will best be understood by reference to the following description, taken in conjunction with the accompanying drawing, in which:

FIGURE 2 is a top plan view, with the lid opened, of the remote camera unit of FIGURE 1;

FIGURE 4 is a schematic block diagram of an automatic camera detection system of the unitary type, in accordance with one embodiment of the invention;

FIGURES 5a and 5b are schematic block diagrams of an automatic camera detection system of the remote camera type, in accordance with another embodiment of the invention;

FIGURE 6 is a schematic wiring diagram of the electronic detection and timing apparatus shown in FIGURE 5a of the drawing;

FIGURE 7 is a schematic wiring diagram of the remote camera apparatus shown in FIGURE 5b of the drawing; and FIGURE 8 is a schematic wiring diagram of the remote invisible light apparatus, in accordance with one preferred embodiment of the invention.

Figure 1:
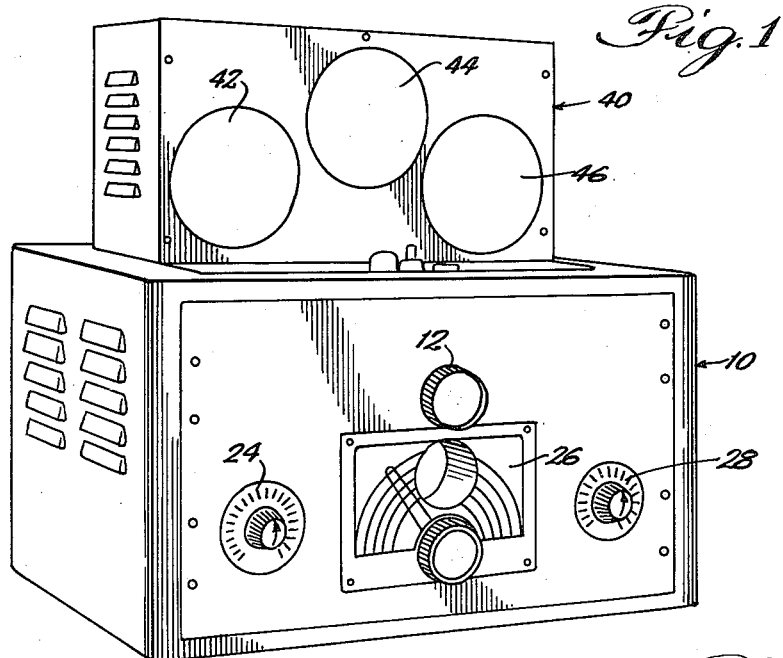
FIGURE 1 is a front perspective view of one illustrative embodiment of the invention comprising the compact housings for the remote camera and invisible light units.

Referring now to the drawing, and more particularly to FIGS. 1 and 2 thereof, there is shown, in pictorial form, the housings for the remote camera and light units, in accordance with the preferred embodiment of the invention. Advantageously, the camera unit comprises a housing 10 having an opening 12 formed in its front panel adapted to receive the lens 14 of the camera 16.

As shown in particular detail in FIG. 2 of the drawing, the camera 16 advantageously is of the type having an electric motor 18 for driving the film, and a bulk film pack 20. In one exemplary embodiment of the invention, the camera 16 was of the type sold under the trade name Praktina, and the bulk film pack 20 used therewith was of the type having fifty feet of film to the end that a relatively large number of exposures could be made from a single film pack.

As stated above, it is important in many applications to keep the subject unaware of the detection and camera apparatus, and towards this end, the camera 16 advantageously is placed in a nest of sound proofing material 22 within the housing 10. If desired, the housing 10 may be made to resemble ordinary radio apparatus by placing the various knobs and dials 24, 26 and 28 on the front panel thereof, to further disguise the true nature of the camera apparatus. Manifestly, the use of knobs and dials for disguising the housing 10, as shown in FIGS. 1 and 2, is optional with the user of the camera apparatus.

As explained in greater detail below, the camera housing 10 also has positioned therewithin a radio receiver 30, a power pack 32 and suitable switching means 34 for causing the camera to be operated in accordance with signals received by the receiver 30. Access to the camera and its associated control equipment within the housing 10 is provided by the lid 36, which is hinged to the top panel of the housing 10.

The housing 40 for the remote invisible light unit is shown in FIG. 1 of the drawing as resting on top of the camera housing 10, and as explained in greater detail below, it will be fully appreciated by those skilled in the art that the invisible light unit 40 may be positioned in any desired manner, either adjacent the camera unit 10 or remote therefrom. In accordance with one preferred embodiment of the invention, the invisible light unit housing 40 comprises three 500 watt photographic spot lamps mounted behind the infra-red filters 42, 44 and 46, respectively. In accordance with well known principles of infra-red light transmission, the infra-red filters 42, 44 and 46 served to transmit light waves in the range of eight thousand to nine thousand angstroms. It has been found that when the light unit 40 is turned on for one second intervals, it is completely invisible, even in total darkness. Advantageously, the film used in the bulk film pack 20 is a high speed infra-red film, manufactured by Eastman Kodak Company. With the system of the invention, it has been found that excellent pictures can be taken under all light conditions, ranging from total darkness to bright sunlight.

Figure 3:
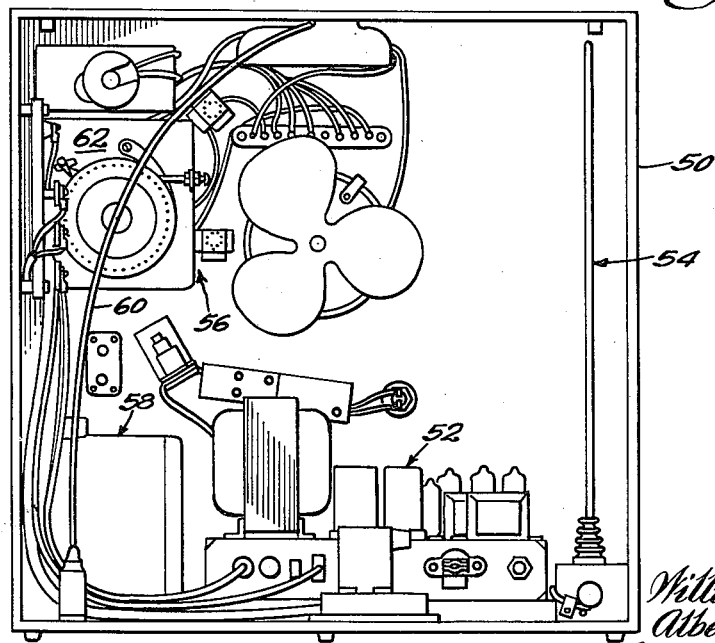
FIGURE 3 is a rear elevational view of the control unit adapted for use with the remote camera and invisible light units of FIGURE 1.

The construction of one preferred embodiment of the detection and control unit 50 is shown in FIG. 3 of the drawing. In accordance with a feature of this invention, the housing for the detection and control unit 50 has positioned therewithin a radar detection unit 52 which includes the antenna 54, timing and switching apparatus 56 and a radio transmitter 58 including the radio antenna 60. The relative simplicity and small number of components comprising the instant invention can be appreciated from the apparatus illustrated in FIGS. 1, 2 and 3 of the drawing. The electrical interconnections and the operation of the invention will now be described in greater detail with reference to FIGS. 4 through 8 of the drawing.

FIG. 4 is a schematic diagram of one illustrative embodiment of the invention wherein all the components may be positioned within a single enclosure, if desired. The radar detection apparatus 52 serves to transmit a high frequency radar beam, and in accordance with a feature of this invention, the range of this radar beam may be adjusted and directed, by suitable shielding, to guard an area from a few inches up to twenty-five feet, or more. In a particular embodiment, constructed in accordance with the invention, the radar detection apparatus 52 comprised a Radar Eye, manufactured and sold by the Radar Eye Corporation of Natick, Massachusetts. The antenna 54 for the radar detection apparatus 52 may be positioned adjacent the radar detection apparatus, as shown in FIG. 3 of the drawing, or if desired, a remote antenna may be installed a desired distance away from the radar detection apparatus and attached to it by a low power cable. Those skilled in the art will readily appreciate that other types of automatic detection devices, such as a photoelectric cell, ultrasonic detection apparatus, etc., may be used in lieu of the radar detection apparatus, but the invention will be described herein with respect to the radar detection apparatus as being one preferred form.

The radar detection unit 52 is connected to a timer 62 which forms a part of the timing and switching means 56. When the radar beam is broken by a person walking within the range of the antenna, the radar detection unit output provides a signal for a predetermined period, such as one minute. This signal, in turn, operates the timer 62 for the same interval of time which, for purposes of illustration, will be considered as one minute for the remainder of the application. Manifestly, this time period can be adjusted to be greater or smaller than one minute, as desired, and still be within the principles of the invention.

As shown in FIG. 3, the timer 62 is of the type having a plurality of contacts which are opened and closed during the period of time that the timer is energized by the radar detection unit 52. In one exemplary embodiment of the invention, the timer 62 is provided with sixty contacts such that during the one minute energization period, the timer opens and closes its contacts one each second during each cycle of operation.

The closing of the timer contacts, one per second during the one minute interval, serves to energize the relay 64 to turn on the light source 66 and activate the camera 68 at the same repetition rate. Thus, each time the relay 64 closes, the invisible light source 66 is turned on and a photograph is taken by the camera 68. It has been found that with a fifty foot bulk film pack 20, described above, the camera 68 was able to take up to four hundred fifty exposures before requiring replacement of the bulk pack. Operating power for the camera motor 18 is supplied by the power pack 70, which serves to convert the 110 v. A.C. source to the 12 v. D.C. required by the camera.

While the particular embodiment of FIG. 4 is highly useful in many applications, it has been found advantageous in other applications to position the camera remote from the detection and control unit to minimize the possibilities of the subject becoming aware of the fact that he is being photographed. Thus, it may be desired to guard a specific area, such as the door to restricted room. In order to detect any unauthorized entry into the restricted room, it is desirable to place the radar detection unit sufficiently close to the door to detect all unauthorized entries. At the same time, to prevent an intruder from becoming aware of the operation of the camera and light unit, it may be desirable to position the camera and light units at a spot remote from the door. This remote positioning of the camera also enables a greater area to be photographed.

In accordance with a further feature of this invention, these desirable objects are obtained by the use of the remote system shown schematically in FIGS. 5a and 5b of the drawing. In accordance with this embodiment of the invention, the radar detection unit 52 energizes the timer 62 in the manner described above, and the closing of the timer contacts once each second causes the relay 72 to close its contacts, thereby energizing the radio transmitter 58 at the same repetition rate. The radio transmitter 58 thereafter transmits a signal of one second duration for each closing of the contacts of relay 72 and, if desired, a counter 74 may be provided to register the number of signals transmitted by the transmitter 58.

The camera unit, which is positioned remote from the radar detection unit in the manner described above, advantageously comprises the radio receiver 30 which, upon receipt of the one second signal from the radio transmitter 58, energizes the relay unit 76 which may form a part receiver 30 or may be separate therefrom. The relay unit 76 closes a contact to energize the invisible light source 40 and then closes a contact to activate the camera 16. This causes a picture to be taken and the film to be transported to the next frame. When the one second signal from the transmitter 58 ceases, the relay unit 76 is de-energized and the system is ready to receive the next signal of the transmitter 58.

Those skilled in the art will readily appreciate that the radio transmitter 58 and receiver 30 may be of any standard type suitable for this purpose. In one particular embodiment constructed in accordance with the invention, the radio transmitter 58 was of the type manufactured for and sold by the Standard Camera Corporation, and the radio receiver 30 was of a type manufactured by the Perma-Power Company of Chicago, Illinois. In addition, the relay unit 76 was included within the radio receiver 30 and comprised two relays of standard manufacture, one having instant contact closing upon receipt of a signal from receiver 30 and the other having delayed contact closing to permit the invisible light source 40 to be turned on slightly before the camera 16 is activated.

The wiring diagrams for the detection and control unit, the receiver camera unit, and the remote light unit are illustrated in FIGS. 6, 7 and 8 of the drawings, respectively. As shown in FIG. 6, the 110 v. A.C. power leads 80 and 82 are connected to the terminals of the timer 62, the transmitter 58, the relay 72 and the radar detection unit 52, as well as the counter 74. Thus, power lead 80 is connected to a coil terminal 84 of relay 72, to an input terminal 86 of transmitter 58, to an input terminal 88 of radar detection unit 52 and to an input terminal 90 of counter 74. The power lead 82 is connected to one contact 90 of the timer 62, to a contact 92 of the relay 72, to the other input terminal 94 of transmitter 58 and to the other input terminal 96 of radar detection unit 52. The motor terminals 98 and 100 of timer 62 are connected to the output terminals 102 and 104 of radar detection unit 52 such that the output signal from the latter causes the timer to cycle for its one minute period of operation. The other contact terminal 106 of timer 62 is connected to the other relay coil terminal 108 of relay 72. The control terminals 110 and 112 of transmitter 58 are connected to the contacts 114 and 116 of relay 72. Also, the contact 118 of relay 72 is connected to the other terminal 120 of the counter 74.

The wiring diagram for the camera unit is shown in FIG. 7 of the drawing. It can also be seen that the 110 v. power leads 122 and 124 are connected to the input terminals 126 and 128 of the power pack 32, the 12 v. D.C. output of which from terminals 130 and 132 is applied to the motor terminals 134 and 136 of camera 16. The power lead 122 also is connected to the coil terminal 138 of the mercury relay 76, to a terminal of the invisible light 40, and to an input terminal 140 of the receiver 30. The power lead 124 is connected to a contact 142 of relay 76, to the input terminal 144 of receiver 30, and to a contact 146 of the instant relay in the receiver 30. The other contact 148 of the instant relay in receiver 30 is connected to the coil terminal 150 of mercury relay 76. As explained above, when the receiver 30 gets a signal from the transmitter 58, the relay in the receiver 30 closes its contacts, which in turn energize the mercury relay 76 to close its contacts to turn on the invisible light 40. A short predetermined period of time later, the delayed relay in the receiver 30 is energized and activates the camera 16. This is effected by the contacts of the delayed relay in the receiver which are connected through other terminals 152 and 154 to the switching terminals 156 and 158 in the camera 16.

The wiring diagrams for the remote light is shown in FIG. 8 of the drawing and, in accordance with one advantageous embodiment of the invention, the remote light unit can be placed any desired distance from the camera unit and needs only to be plugged into a 110 v. A.C. source to operate. Thus, the power leads 162 and 164 are connected to the input terminals 166 and 168 of receiver 170. In addition, the power lead 162 is connected to a contact terminal 172 of receiver 170 and to a contact terminal 174 of the mercury relay 176. The power lead 164 is connected to a coil terminal 178 of mercury relay 176 and to one side of the invisible light 40, the other side of which is connected to the contact terminal 180 of relay 176. The circuit is completed by connecting the contact terminal 182 of receiver 170 to the coil terminal 184 of relay 176.

In the construction of the remote light unit, the radio receiver 170 may be identical to the radio receiver 30 which form a part of the camera unit shown in FIG. 7 of the drawing. In addition, the mercury relay 176 may take the form of a 20 ampere relay of the type manufactured by the Ebert Manufacturing Company of New York. When the receiver 170 receives a signal from the transmitter 58, the relay in the receiver closes its contacts to energize the mercury relay 176. The mercury relay closes its contacts to turn on the invisible light 40. As previously described, a short time later, such as one-half second, the delayed relay of the receiver 30 in the camera housing closes its contacts to activate the camera 16.

While we have shown and described the specific embodiment of the present invention, it will, of course, be understood that various modifications and alternative constructions can be made without departing from the true spirit and scope of the invention. It is therefore intended by the appended claims to cover all such modifications and alternative constructions as fall within their true spirit and scope.

What is claimed as the invention is:

1. The improvement of an electronically controlled camera detection system comprising a first housing having positioned therewithin radar means for transmitting a beam in an area to be guarded and for producing a signal upon interruption of said beam by an unauthorized entry within said area, timing and switching means connected to the signal output of said radar means and responsive to each signal therefrom for providing a plurality of switching operations over a predetermined time period, a radio transmitter connected to said timing and switching means and adapted to transmit a radio signal for each switching operation, a source of invisible light positioned remote from said first housing and responsive to said radio signals to be energized for each switching operation, and a second housing having positioned therewithin camera means including a film pack and a motor for transporting the film through the exposure area of the camera, a radio receiver for receiving said radio signals, and switching means connecting said camera means to said radio receiver for providing a plurality of exposures as determined by said switching operations.

2. The improvement of an electronically controlled camera detection system comprising high frequency radiation means for transmitting a beam in an area to be guarded and for producing a signal upon interruption of said beam, timing and switching means including a plurality of contacts, a wiper, and a motor for driving the wiper across the contacts, means connecting the motor to the signal output of said high frequency radiation means such that each signal therefrom provides a plurality of switching operations over a predetermined time period, a source of invisible light controlled by said switching operation, camera means including a film pack and a film drive motor for transporting the film through the exposure area of the camera, and means enabling said camera and film drive motor to be controlled by said switching and timing means for providing a plurality of exposures as determined by said switching operations.

3. The improvement of an electronically controlled camera detection system in accordance with claim 2 wherein said timing and switching means comprises sixty contacts, and said wiper is driven across said contacts for a one minute interval each time the motor is energized by said signal output to provide one switching function per second for each signal output.

4. The improvement of an electronically controlled camera detection system in accordance with claim 2 further comprising a counter connected to the output of said timing and switching means for summing the number of switching operations effected by the system.

5. An electronically controlled camera detection system comprising a first housing adapted to be positioned near the area to be guarded and including energy radiation means for transmitting a beam in the area to be guarded and for producing a signal upon interruption of said beam by an unauthorized entry within said area, timing and switching means connected to the signal output of said energy radiation means and responsive to each signal therefrom for providing a plurality of switching operations over a predetermined time period; and a second housing adapted to be positioned remote from the area to be guarded and including camera means, a motor for transporting film through the exposure area of the camera means; and means communicating said camera means and said motor with said switching and timing means for providing a plurality of exposures as determined by said switching operations, said last named means comprising a radio transmitter in said first housing adapted to be energized by said timing and switching means for transmitting radio signals, and radio receiver means in said second housing for receiving said radio signals and controlling the camera means and motor in accordance therewith.

6. An electronically controlled camera detection system in accordance with claim 5 further comprising a source of infra-red light connected to a radio receiver and adapted to be energized in accordance with the radio signals transmitted by said radio transmitter and received by said receiver.

7. In an electronically controlled camera detection system, the combination of energy radiation means for transmitting a beam in an area to be guarded and for producing a signal upon interruption of said beam by an unauthorized entry within said area, timing and switching means connected to the signal output of said energy radiation means and responsive to each signal therefrom for providing a plurality of switching operations over a predetermined time period, a source of invisible light connected to said timing and switching means adapted to be energized by said switching operations, a camera including a film pack, a film drive motor for transporting the film through the exposure area of the camera, means for mounting said camera and said motor to minimize the noise of operation thereof such that the camera system and its operation be inconspicuous, said last named means including a separate enclosure for said camera, film drive motor and film pack, and sound proofing means surrounding said separate enclosure for minimizing noise transmission therefrom, and means connecting said camera means to said switching and timing means for providing a plurality of exposures as determined by said switching operations.

References Cited in the file of this patent
UNITED STATES PATENTS

| | | |
|---|---|---|
| 2,086,087 | Melton | July 6, 1937 |
| 2,139,703 | Taylor | Dec. 13, 1938 |
| 2,250,834 | Howton | July 29, 1941 |
| 2,640,186 | Hasbrook | May 26, 1953 |
| 2,769,165 | Bower | Oct. 30, 1956 |
| 2,785,395 | Platzman | Mar. 12, 1957 |